Oct. 27, 1970   G. C. BHAGAT   3,536,398
REPRODUCTION APPARATUS

Filed Aug. 12, 1968   3 Sheets-Sheet 2

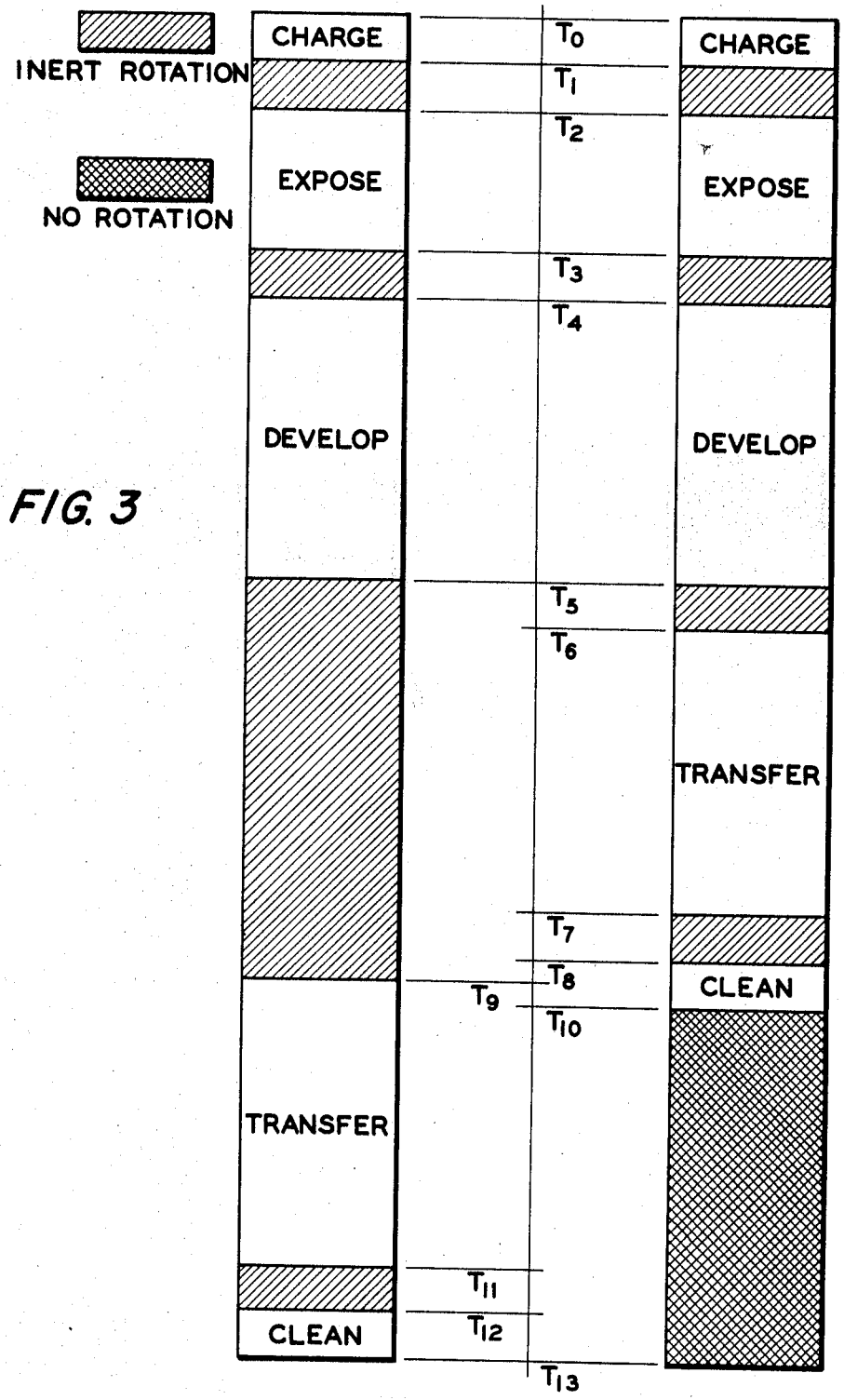

United States Patent Office 3,536,398
Patented Oct. 27, 1970

---

3,536,398
REPRODUCTION APPARATUS
Gopal C. Bhagat, Rochester, N.Y., assignor to Xerox Corporation, Rochester, N.Y., a corporation of New York
Filed Aug. 12, 1968, Ser. No. 752,055
Int. Cl. G03b 15/00
U.S. Cl. 355—3    5 Claims

ABSTRACT OF THE DISCLOSURE

An apparatus for duplex printing or reproducing information existing on both sides of an original by exposing the first side of the original to a photoconductive drum of a first circumference, and, at the same time, exposing a second photoconductive drum of a second circumference, and then successively transferring each image to opposite sides of a support material.

---

This invention relates to electrostatic printing and in particular to a method and apparatus for printing simultaneously on both sides of a substrate material.

It is frequently desirable to use ordinary printed sheets as originals in a reproduction process. Many times, however, the information to be reproduced exists on both sides of the original sheet and in order to completely reproduce such originals with the presently known copiers, two individual copy steps are necessary. The original is first exposed on one side and a copy is made of it, then the operator of the copier must reverse the original and expose the opposite side to make a copy of it. This two-step procedure is very time consuming and the copier requires the constant attention of the operator so that the original is manipulated properly. In addition, the number of sheets or rolls of paper used is doubled for each two-sided master reproduced since information can be conveniently placed only on one side of the copy sheet at a time.

Various feeding attachments for copiers have been developed to reverse the two-sided original after copying the first side in order to make the copier more completely automatic and eliminate the need of the manual operation, but these attachments are usually bulky, expensive to manufacture and subject to maladjustment thereby creating the hazard of possible destruction of the original as it is guided by the mechanism. Such attachments, although they can be made to operate rapidly, do not overcome the disadvantage of successive exposures of each side of the original which wastes time, or the disadvantage of using two sheets for a complete copy of the two-sided original which wastes materials.

Although most copiers have the capability of reproducing information on the two sides of a single copy sheet if each side of the copy sheet is exposed, developed and fixed individually, it is not an easy result to accomplish. The copy sheet must be redirected into the feed tray of the machine after the first side of the original has been copied onto it and made permanent. Then, after the copy sheet is reversed and fed back into the machine, the second side of the original is exposed, developed and fixed to it. Even under ordinary conditions the reentry of the copy sheet to the copier is difficult especially when many originals are copied since the correct original as well as the proper side of the original must be exposed upon any specific copy sheet in order that the two sides of the copy sheet match the two sides of the original.

Accordingly, it is an object of this invention to improve the method and apparatus for copying both sides of an original which overcomes the deficiencies of the prior art devices as described above.

A second object of the invention is to reproduce both sides of an original simultaneously.

A third object of the invention is to optically expose both sides of an original simultaneously to respective photoconductive surfaces.

Another object of the invention is to transfer in substantial alignment onto opposite sides of a substrate material the developed images on two xerographic drums having different circumferences.

This invention uses two photoconductive plates upon which electrostatic latent images can be produced. The latent images are produced on the surfaces simultaneously, developed with toner particles or powder and then transferred to a permanent support material either simultaneously or sequentially. In one embodiment of the invention two photosensitive drums of different circumferences are used to copy both sides of a two-sided original simultaneously. Both drums travel at identical surface speed while one side of the original is illuminated to expose the first drum and the other side of the original is illuminated to expose the second drum. The electrostatic latent image formed on the drum of smaller circumference is developed and transferred to the support material first. Due to its larger circumference the image on the second drum does not reach the transfer position until the image on the smaller drum has been transferred to one side of the support material and the support material reaches the transfer position of the second drum. The images are fused to the support material after being transferred.

For a better understanding of the invention as well as other objects and further features thereof, reference is had to the following detailed description of the invention to be used in conjunction with the accompanying drawings, wherein:

FIG. 3 is a time chart comparing the sequence of the various steps in the xerographic process on the two xerographic drums.

The present invention uses two photoconductive insulating plates capable of retaining an electrostatic latent image. These plates can assume any convenient shape such as a flat plate, drum or, of any other functional configuration. The electrostatic latent image can be produced on the surface in any suitable manner such as through the process of xerography, electrography, etc. For the purposes of this description, however, the invention is described only within the environment of xerographically formed images produced from rotatable drums.

Figure 1:
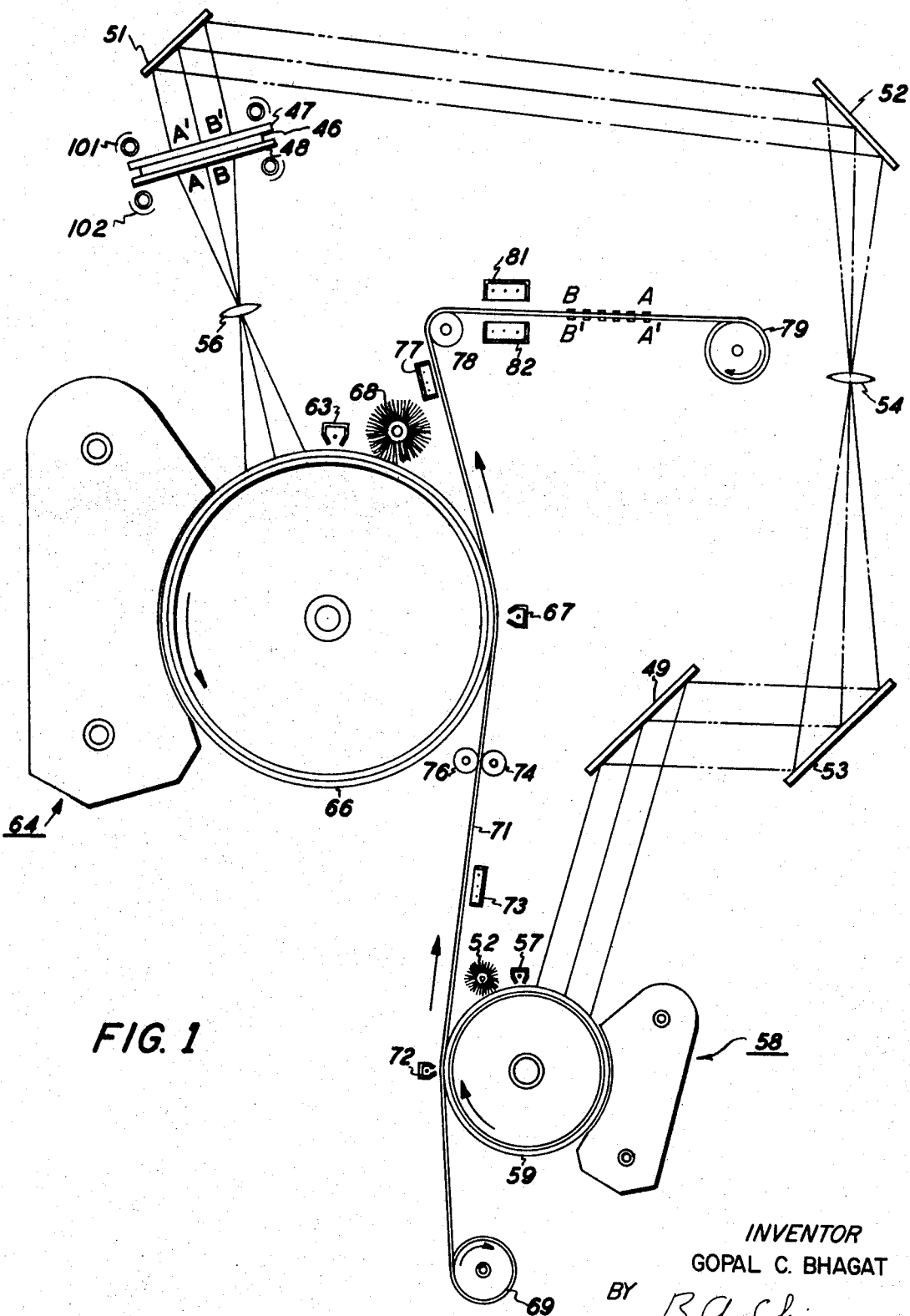
FIG. 1 is a schematic illustration of a xerographic reproduction machine showing the path of a transfer web, the relative positions of two xerographic drums to each other and to the transfer web, and the relative sizes of the xerographic drums.

In FIG. 1, there is shown the general elements of the invention which includes two photoconductive plates in the form of drums to accomplish reproduction of a two-sided original. Simultaneously, each side of the original is illuminated to expose its own xerographic drum and thereafter the drums are developed and the resultant powder images transferred onto opposite sides of support material such as sheet material or web. Of these three steps only the transfer step should be carried out in succession when two drums are utilized, and the reason for this will be explained in detail below.

The original can be a sheet, continuous web, or other material bearing information on both sides. It may also comprise two sheets or webs printed in simplex, that is, printed on one side only and be positioned back-to-back to form two sided or duplex printed material. In FIG. 1 the single sheet 46 is shown illustratively as the original.

The sheet 46 is placed between two transparent plates or platens, upper platen 47 and lower platen 48, where it is held in a flattened, unbuckled position while illumination thereof is taking place. If the original takes the form of a sheet it can be placed and held between the platens either manually or by an automatic document feeding mechanism until exposure is completed. If, on the other hand, the original takes the form of a continuous web, it can be fed between the two platens in a continuous manner and held optically relative to the xerographic drums in any suitable manner known in the art. The illumination lamps 101, 102 may be arranged to scan each side of the original 46, such as the illumination apparatus disclosed in U.S. Pat. 3,062,095, or be adapted to effect "flash" exposure of the original. The two sides of the original are scanned simultaneously to keep the time for duplex exposure at a minimum. The scanning operation is such that the information on each side of the original is scanned, projected, and imaged onto the respective drums in synchronism with the movement of the surface of the drums.

Figure 2:
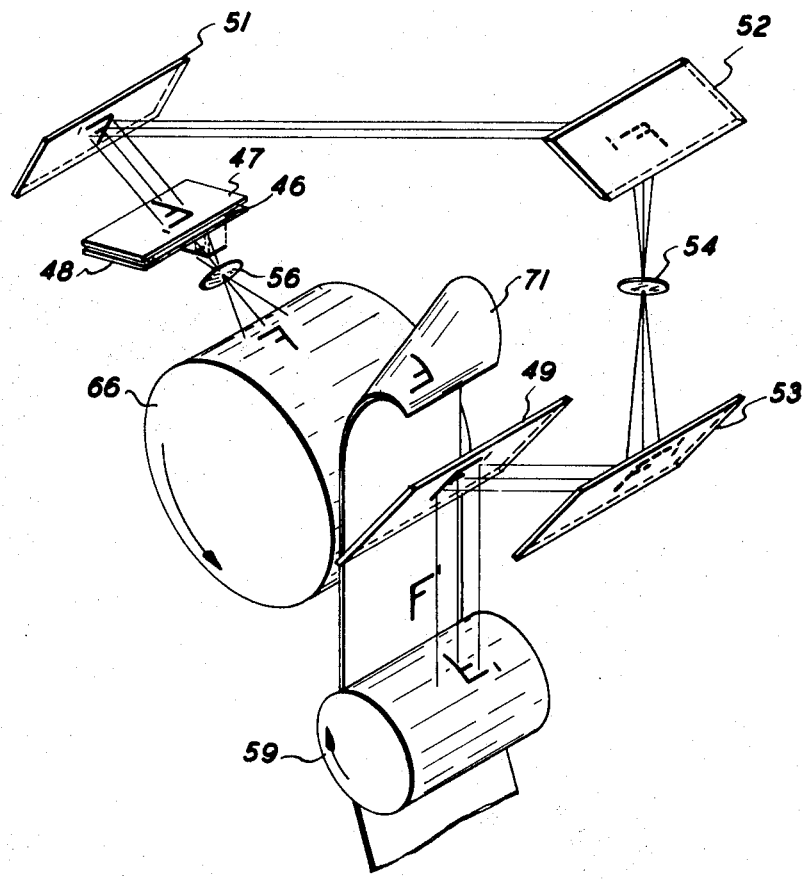
FIG. 2 is a schematic illustration showing that right reading images are placed on the web by both xerographic drums.

For reproducing both sides of an original on a single copy sheet, that is, for duplex copying, it is necessary to give some consideration to the optical system used to assure both sides of the copy are right-reading. Referring to FIGS. 1 and 2, the lower side of original 46 has two reference points A and B while the upper side of the original has corresponding reference points $A^1$ and $B^1$. When both images are finally transferred to the web, A must be opposite $A^1$ and B opposite $B^1$ to result in a properly reproduced original. For simplicity, the scanning apparatus is not shown in FIG. 2.

The optical system between the lower side of the original and drum 66 includes merely a projection lens 56. Therefore, the image projected onto the drum will be wrong-reading, as represented by the "F" just above the drum in FIG. 3. Since the drum 66 is provided with an exposure slot as are copiers of this general configuration, the image on the drum will be upright. With the drum rotating counterclockwise, the top of the image "F" will be transferred to web 71 before the lower end thereof and will be the leading edge of the image on the web. Also, after transfer, the wrong-reading image on the drum will be right-reading when placed on the web as indicated by the "F."

The optical system between the upper side of the original and drum 59 comprises mirrors 51, 52, 53, and 49, and a projection lens 54. The light rays from the upper side of the original are reversed by the mirror 51 and rendered right-reading by the mirror 52. The lens 54, in turn, reverses the image, while the mirror 53 makes the image right-reading. Finally, the mirror 49 reverses the image before it is projected through an exposure slit (not shown) and on drum 59. In each instance, the effect of the mirror or lens is represented by the symbol "F". The image, as placed on drum 59, is reversed and upright due to the mirror-lens system and the exposure slit between the upper side of the original and drum 59.

Since A and $A^1$ were transferred to their respective sides of the web before B and $B^1$, and both images are right-reading on their respective sides of the web, the copy on the web is an accurate reproduction of the original. In FIG. 2, the respective images are correctly aligned to one another as indicated by the relative positions of A, $A^1$, B, and $B^1$ on the web just prior to being wound on reel 79.

Referring to FIG. 1, prior to the lower side of the original being imaged onto xerographic drum 66, the drum is charged uniformly by corona charging device 63, and after exposure, the drum is developed by a suitable developing device schematically indicated by 64. The drum thereafter locates the developed image at a position where it makes contact with the left side of web 71 where corona transfer device 67 aides in the transfer of the image to the web. After the image has been transferred from the drum 66, a cleaning device 68 removes any residual developer remaining on the surface of the drum thereby preparing the drum for reuse. Further description of xerographic processing and of details of the devices 63, 64, 67 and 68, the power supplies and drives therefore are not necessary to understand the invention herein. Such details may be acquired from any one of a number of U.S. patents such as Pat. No. 3,162,109 to Mayo et al.

In a similar manner, the xerographic drum 59, prior to exposure, is uniformly charged by any suitable device such as corona charging device 57, and thereafter exposed to a light pattern or image conforming to the information on the upper side of sheet 46. Next, the latent electrostatic image on drum 59 is developed by a suitable developing mechanism 58 which deposits toner particles upon the latent image to render the same visible and transferable. After image development, the drum locates the image adjacent the right side of web 71 where a corona transfer device 72 assists in transferring the toner particles image from the surface of drum 59 to the web. Thereafter, the drum passes the cleaning device 52 which removes any residual toner particles remaining on the surface of the drum after transfer preparing it for reuse.

The web 71 can be any suitable support material to which the image can be fused or otherwise made permanent. For instance, the web can be paper, plastic, metal, etc., and can take the form of individual sheets, a continuous strip, or any other convenient form. As shown in FIG. 1, the web is a continuous strip of ordinary paper fed from the supply roll 69. Web 71 may also consist of any suitable transfer material which serves as an intermediate to which the developed image is transferred prior to being placed on its support substrate.

The web is initially fed from the roll 69 in synchronism with the speed of the surface of the drums, and, after transfer and fusing have taken place for the images on both sides, the web is rewound on a takeup roll 79. The web first passes adjacent drum 59 where the images on the surface of the drum is transferred to the right side of the web. The web continues under a fuser 73 which acts to partially fuse or fix the transferred image upon the web. The image is only partially fused at this point, preferably, in order that web remains relatively cool so as not to adversely affect the transfer process to its other side. Although it is advantageous that some fusing take place on the image first transferred, such fusing is optional. In the alternative, the image transferred onto the right side of the web from drum 59 may be completely fused by an element such as the fuser 73. However, because of the quantity of heat necessary to effect good fusing, the web would either have to be quickly cooled before the image on drum 66 were transferred to the opposite side of the web or the path of travel of the web between fuser 73 and corona transfer device 63 would have to be lengthened in order that sufficient time is given for the surrounding air to cool the web. The toner images can be made permanent by any suitable method that lends itself to the system such as by vapor fusing, roll compression, etc., heat fusing not being critical to the operation of the invention.

After passing under the fuser 73, the web is further guided by guide rollers 74 and 76 into contact with drum 66. The circumferences of drums 59 and 66 are of such sizes that as the leading edge of the image already placed on the right side of the web reaches corona device 67, the leading edge of the developed image existing on xerographic drum 66 also reaches corona device 67. In this manner the image existent on drum 66 is transferred, with the aid of corona device 67, onto the left side of the web in substantial alignment with the image on the right side of the web. After transfer of the image to the left side of the web is accomplished, the image can be partially fused by passing it under fuser 77. The web is then brought around support roller 78 and between fuser devices 81 and 82 which permanently fuses the powdered images on both sides of the web. Thereafter, the web is rewound on roll 79 for storage. Fuser 77 is optional and can be deleted, especially if the path of travel between corona device 67 and fuser 81 is relatively short, since there is nothing along the length of the path of the web to disturb the unfused image placed on the left side of the web. The direction of rotation of drum 66 is counterclockwise while the direction of rotation of drum 59 is clockwise throughout the various steps of the reproduction process. As mentioned above in conjunction with FIG. 2, these directions of rotation are necessary to achieve a proper reproduction of the original.

Important to the invention is the relative circumferences of xerographic drums 59 and 66. The two drums rotate at an identical circumferential speed, however, the image carried by drum 59 is transferred to the web prior in time that the image on drum 66 is transferred to the opposite side of the web. In order to delay transfer of the image formed on drum 66 until the correct portion of the web is adjacent corona device 67, drum 66 is formed with a larger diameter than drum 59. The exact difference in circumference lengths is a direct function of the path of travel that web 71 takes between corona device 72 and corona device 67. In other words, the larger the distance between these two transfer devices, the larger the difference in the circumferences of the drums 59, 66. The exact relationship is set out below.

Essentially, the amount of time which elapses between the time the image on drum 59 commences transfer to the web and the time the image on drum 66 commences transfer to the web is a function of the distance the web travels between the transfer device 72 and the transfer device 67. This relationship, of course, assumes that the linear speed of the web is equal to the surface speed of the two drums. Assuming that the distance the web travels between devices 72 and 67 is L units, the following relaationships are valid:

$$R_{59}A_{59} = R_{66}A_{66}$$

where $R_{59}$ is the radius of drum 59, $A_{59}$ is the angle through which drum 59 travels to transfer the image onto web 71, $R_{66}$ is the radius of drum 66, and $A_{66}$ is the angle through which drum 66 travels to transfer its entire image onto web 71. In addition, it is known that the circumference of drum 66 has to be at least equal to the circumference of drum 59 plus L units, the distance the web travels between the drums. This relationship, of course, assumes that the leading edge of the information area on both sides of the original is to be in alignment. Thus, a second relationship between the radii of the two drums follows:

$$2\pi R_{66} = 2\pi R_{59} + L$$

$$R_{66} = R_{59} + \frac{L}{2\pi}$$

Therefore, by simply knowing the radius of one drum and the distance the web travels between charging devices 72 and 67, the exact size of the other drum can be calculated.

To illustrate the various steps in the xerographic process of drum 59 as compared to drum 66, reference is had to FIG. 3, a comparison of the time diagram for xerographic processing with the two drums. At $T_0$ both drums are beginning to be charged by their respective corona charging devices, charging device 57 on drum 59 and charging device 63 on drum 66. After uniform charging of the photosensitive layer is accomplished, or at $T_1$, the drums rotate to their exposure positions. At $T_2$ both sides of the original are simultaneously illuminated to expose their respective xerographic drums. At this time, the imaging light rays of the lower side of the original are directed onto drum 66 while the imaging light rays of the upper side of the original are directed onto drum 59. Exposure of the two drums in the system is completed by $T_3$ and each drum proceeds to its respective development station. Development begins at $T_4$ and is completed at $T_5$.

At $T_5$ both drums proceed to the remaining steps in the xerographic process, however, the remaining steps are carried out on drum 59 forthwithly while the remaining steps on drum 66 are delayed somewhat. At $T_5$ both drums proceed towards the transfer position. At $T_6$ the developed image on drum 59 begins to be transferred to the right side of web 71. During this time, due to the increased circumference of drum 66, the image on drum 66 continues to rotate in what is called inert rotation, i.e., no xerographic step is being carried out on the image on drum 66 at this time. At $T_7$ the image on drum 59 has been completely transferred to the right side of web 71 from drum 59 and the web proceeds to fuser 73, through the pinch rollers and onto the transfer area of drum 66. After the image carried by drum 59 is placed on the web, drum 59 continues toward cleaning device 62 where it is cleaned between $T_8$ and $T_{10}$.

After drum 59 is cleaned, it can either be stopped until drum 66 has been cleaned, or in the alternative, it can continue in inert rotation. If drum 59 is stopped, it may be necessary to lift web 71, in FIG. 2, away from the circumference of drum 59 after transfer is completed from drum 59 since web 71 continues to be fed towards drum 66. This would be desirable because otherwise the web would continue to rub against and injure the photosensitive surface of drum 59. Any suitable mechanism can be used to lift the web slightly away from the drum so that contact is no longer had, but such a device is optional. If used, the mechanism could be controlled electrically and programmed to lift the paper away from the surface of drum 59 just at the time that the drum stops, and allow the web to contact the drum surface again as drum 59 reaches its transfer position in a subsequent cycle. If, on the other hand, drum 59 continues in inert rotation during the time it is awaiting the next exposure, the lift mechanism would not be necessary.

When the imaged area of web 71 reaches transfer device 67, the developed image on drum 66 also reaches the transfer device. Therefore, at $T_9$, the developed image on drum 66 begins to transfer onto the left side of the web until transfer is completed at $T_{11}$. After transfer, drum 66 rotates to its cleaning device 68, where it is cleaned between $T_{12}$ and $T_{13}$. It then can cease its rotation until a new original is placed between the platens and wait until a new cycle begins, or it can continue immediately into a new cycle along with drum 59 if multiple copies of one original are desired.

The time diagram shown in FIG. 3 can be modified in any respect but one; that is, transfer of the image on drum 66 must take place sometime after transfer of the image on drum 59 takes place. This sequential method of transfer is necessary due to the different circumferences of the drums. Whether transfer of the image from drum 66 takes place during the cleaning cycle of drum 59 or while drum 59 is stopped is immaterial. However, as mentioned above, it must begin sometime after $T_6$ has elapsed.

The invention is herein disclosed in detail within the environment of the xerographic process. It is pointed out at this juncture that other electrostatic reproduction processes can be utilized in the invention such as, any process utilizing a photoconductive plate upon which an electrostatic image is formed, and developed and fused to be the finished reproduction. Any suitable manner of forming a powder image on plates 59 and 66 which can be transferred to a transfer material can be utilized. For example, the powder images may be transferred fully formed onto the plates rather than formed on the plates themselves. In addition, methods other than xerography may be used to form the images on the plates such as by the utilization of character electrodes as disclosed by Shull in Re. 25,830, xeroprinting masters as disclosed by Schaffert in 2,576,047, or any other suitable method.

It is intended that appropriate drive mechanisms and control circuits be a part of the general disclosure herein, but such apparatus is not shown since the elements can be of any suitable design to accomplish the operational movement of the invention, as described above.

What is claimed is:

1. An electrostatic reproduction machine for printing on both sides of support material the information contained respectively on two sides of an original including
   a first photoconductive plate being movable in a closed path and having an exposure station at which one side of the original is adapted to be imaged,
   a second photoconductive plate being movable in a closed path and having an exposure station at which the other side of the original is adapted to be imaged,
   means for producing imaging light rays of both sides of the original simultaneously and directing the rays upon said photoconductive plates respectively, at said exposure stations,
   means for moving said plates in their respective paths at approximately the same speed during processing of electrostatic images thereon,
   said closed path of said first plate being longer than the closed path of said second plate.

2. The electrostatic reproducing machine of claim 1 wherein said photoconductive plates are in the form of drums.

3. The electrostatic machine of claim 2 wherein the diameter of the first photoconductive drum is longer than the diameter of said second drum.

4. An electrostatic reproduction machine for printing on both sides of support material the information contained respectively on two sides of an original including
   a first electrostatic drum having an exposure station at which one side of the original is adapted to be imaged, said drum having a transfer station associated therewith and arranged to effect transfer of the developed electrostatic image of said one side of the original to one side of support material,
   a second electrostatic drum having an exposure station at which the other side of the original is adapted to be imaged, said second drum having a transfer station associated therewith and arranged to effect transfer of the developed electrostatic image of said other side of the original to the other side of the support material,
   means for producing imaging light rays of both sides of the original and directing the rays upon said drums respectively, at said exposure stations,
   means for rotating said drums at speeds to effect approximately the same peripheral speed during processing of electrostatic images thereon and transfer therefrom,
   said first drum having a larger diameter than that of said second drum whereby the period for electrostatic processing for one drum differs from that of the other.

5. The machine of claim 4 wherein said means for producing imaging light rays is adapted to produce the rays for the first plate simultaneously with the producing of the rays for the second plate.

References Cited

UNITED STATES PATENTS 3,318,212   5/1967   Rubin _____ 355—3

JOHN M. HORAN, Primary Examiner

U.S. Cl. X.R.

355—23, 26